(12) United States Patent
Perry (10) Patent No.: US 7,234,044 B1
(45) Date of Patent: Jun. 19, 2007

(54) PROCESSOR REGISTERS HAVING STATE INFORMATION

(75) Inventor: Steven Perry, Wycombe (GB)

(73) Assignee: Altera Corporation, San Jose, CA (US)

( * ) Notice: Subject to any disclaimer, the term of this patent is extended or adjusted under 35 U.S.C. 154(b) by 419 days.

(21) Appl. No.: 10/727,850

(22) Filed: Dec. 3, 2003

(51) Int. Cl.
*G06F 9/302* (2006.01)
*G06F 9/30* (2006.01)

(52) U.S. Cl. ...................... 712/228; 712/219
(58) Field of Classification Search .......... 712/228, 712/219
See application file for complete search history.

(56) References Cited

U.S. PATENT DOCUMENTS

| | | | | |
|---|---|---|---|---|
| 4,876,660 A | * | 10/1989 | Owen et al. ............ | 708/603 |
| 5,042,000 A | * | 8/1991 | Baldwin .............. | 708/404 |
| 5,181,226 A | * | 1/1993 | Cantwell ............. | 375/130 |
| 5,933,627 A | * | 8/1999 | Parady .............. | 712/228 |
| 5,958,024 A | * | 9/1999 | Typaldos et al. ....... | 710/26 |

OTHER PUBLICATIONS

Patterson, John. Hennessy, David. "Computer Architecture: A Quantitative Approach". Morgan Kaufmann Publishers, Inc. 3rd Edition, May 17, 2002. pp. A-8 and A-9.*
Rosenberg, Jerry. "Dictionary of Computers, Information Processing, and Telecommunications". John Wiley & Sons, 2nd Edition. 1987.*
Wennberg et al. "Counter Specification". Oct. 15, 2001. Obtained from: ☐☐http://www.arp.harvard.edu/eng/elec/ct64spec.html.*
Adrian Johnson, "Digital Signal Processor", CS 490/EE 690 Final Project, Spring 1998, www.nbb.cornell.edu, 7 pages.
Steve Wilson, "Roll Your own Micro When other Alternatives Fail, create your own Microprocessor", Chip Design Magazine, published Feb./Mar. 2004, 5 pages.

* cited by examiner

*Primary Examiner*—Eddie Chan
*Assistant Examiner*—Robert Fennema
(74) *Attorney, Agent, or Firm*—Beyer Weaver LLP (57) ABSTRACT

Methods and apparatus are provided for implementing an efficient processor having state information included in each register. A processor has registers configured to hold both data and state information, such as carry and overflow information. State information and data can be read and written in the same operation. Holding state information along with data in the same register can provide a variety of benefits, particularly in the context of multithreaded programmable chips.

31 Claims, 11 Drawing Sheets

18-Bit RAM Word 301

| Status Bits 303 | 16-Bit Register Contents 305 |
|---|---|

Figure 1

PRIOR ART

| Context Identifier 701 | Register Address 703 | Register Data 705 |
|---|---|---|
| 0 0 | 0 0 0 0 0 0 | 0 1 0 0 1 0 1 1 1 0 1 0 0 1 0 0 |
| 0 0 | 0 0 0 0 0 1 | 0 1 0 0 1 1 1 0 0 0 1 0 0 1 0 1 |
| 0 0 | 0 0 0 0 1 0 | 1 1 1 0 1 0 1 1 1 0 1 0 0 1 1 1 |
| ... | ... | ... |
| 0 0 | 1 1 1 1 1 1 | 0 0 0 0 1 0 1 1 1 0 1 1 0 1 0 1 |
| 0 1 | 0 0 0 0 0 0 | 0 1 0 0 1 0 1 0 1 0 1 0 0 1 0 0 |
| ... | ... | ... |
| 0 1 | 1 1 1 1 1 1 | 0 0 0 0 1 0 1 0 0 1 0 1 1 0 1 0 |
| 1 0 | 0 0 0 0 0 0 | 0 1 0 0 1 0 1 1 1 0 1 0 0 1 0 0 |
| ... | ... | ... |
| 1 0 | 1 1 1 1 1 1 | 0 0 0 1 0 1 0 0 0 0 1 0 1 0 0 1 |
| 1 1 | 0 0 0 0 0 0 | 1 1 1 1 0 0 0 0 1 0 1 0 0 1 0 0 |
| ... | ... | ... |
| 1 1 | 1 1 1 1 1 1 | 0 1 0 0 1 0 1 1 0 1 0 0 1 0 1 1 |

PROCESSOR REGISTERS HAVING STATE INFORMATION

BACKGROUND OF THE INVENTION

1. Field of the Invention

The present invention relates to processor registers. In one example, the present invention relates to methods and apparatus for providing state information in processor registers to allow the implementation of a more efficient processor.

2. Description of the Prior Art

Electronic devices such as processors have datapaths for handling input and providing output. For example, a processor may have a datapath such as a reduced instruction set computing (RISC) datapath. The supported datapath may be associated with taking an instruction, performing an operation on input values, and providing resulting output values. Processors typically include control circuitry, an arithmetic logic unit (ALU), and memory (e.g. registers, cache, RAM and ROM) for processing instructions.

Elements on the processor datapath typically have a designated width. For example, a 16-bit ALU may be coupled to 16-bit registers. The 16-bit ALU is operable to take data from 16-bit registers and write the result to another 16-bit register. However, certain computations yield results that can not be fully expressed in a 16-bit output. Consequently, additional mechanisms are often provided in order to handle results that can not be fully expressed. The additional mechanisms, however, can be complex and inefficient.

In some instances, providing registers for holding overflow information or carry information can consume valuable chip resources. It is therefore desirable to provide improved methods and apparatus for implementing electronic devices such as processors. More specifically, it is desirable to provide improved techniques and mechanisms for implementing processor pipelines with more efficient mechanisms for handling state information.

SUMMARY OF THE INVENTION

Methods and apparatus are provided for implementing an efficient processor having state information included in each register. A processor has registers configured to hold both data and state information, such as carry and overflow information. State information and data can be read and written in the same operation. Holding state information along with data in the same register can provide a variety of benefits, particularly in the context of multithreaded programmable chips.

In one embodiment, a processor is provided. The processor includes a plurality of registers and an arithmetic logic unit. Each of the plurality of registers comprises data bits for holding data and one or more flag and status bits for holding carry flag information. The arithmetic logic unit is coupled to the plurality of registers. The arithmetic logic unit is configured to write data and carry flag information to one of the plurality of registers.

In another embodiment, a method for processing data is provided. Data is provided to an arithmetic logic unit associated with a processor. The data is obtained from registers comprising data bits for holding data and one or more flag and status bits for holding carry flag information. The data is processed at the arithmetic logic unit. The arithmetic logic unit is coupled to the plurality of registers. The arithmetic logic unit is configured to write data and carry flag information to a result register.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processors.

However, it should be noted that the techniques of the present invention can be applied to a variety of electronic devices with feedback in the datapath. Processors are a good example of electronic devices with feedback in the datapath. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Conventional processors are used in a variety of different systems. Processors include central processing units, digital signal processors, graphics accelerators, processor cores, etc. Any logic, mechanism, or device that supports an instruction set is referred to herein as a processor. Processor designs vary widely, but typically processors include control circuitry, an arithmetic logic unit (ALU), and memory (e.g. registers, cache, RAM and ROM). In some examples, a processor can support a complex instruction set computing (CISC) instruction set while in other examples, processor can support a reduced instruction set computing (RISC) instruction set. A variety of other instruction sets can also be used.

Many conventional processors are configured to handle a particular number of bits. For example, an processor can be a 16-bit RISC processor or a 32-bit RISC processor. A 32-bit RISC processor has 32-bit data path and is capable of performing operations on 32-bit numbers. For example, an arithmetic logic unit within the 32-bit RISC processor would be operable to subtract a 32-bit number from another 32-bit number and place the result in a 32-bit register. However, some results or intermediate results of processor operations on 32-bit numbers can not be fully represented in a 32-bit result. That is, some results can not be represented with the available hardware (e.g. 32-bit register).

For example, carry bits and flags are often used with unsigned operations when a result can not be fully represented. In one example, a carry flag is needed when an unsigned 16-bit number is added to another unsigned 16-bit number and the result can only be represented by an unsigned 17-bit number. The result is often a 16-bit number along with a carry flag used to indicate that a carry bit should be associated with the 16-bit number to fully represent the result. The actual result can be recovered by combining the 16-bit number with the carry bit. A carry output can similarly be encountered with unsigned subtraction.

In another example, overflow bits and flags are often used with signed two-complement operations when a result can not be fully represented. The two's complement system represents numbers in a manner that allows each successive two's complement number to be obtained by adding 1 to the previous number, ignoring all carries beyond the most significant bit. Negative numbers have a leading 1 and positive numbers and zero have a leading 0. For example, a 4-bit two's complement series allows representation of the numbers −8, −7, −6, −5, −4, −3, −2, −1, 0, . . . , 6, and 7 as 1000, 1001, 1010, 1011, 1100, 1101, 1110, 1111, 0000, . . . , 0110, and 0111. When addition or subtraction of two 4-bit two's complement numbers yields a result less than −8 or greater than +7, overflow occurs. This can be detected when the signs of the addends are the same and the signs of the result is different than the addends' sign.

Arithmetic overflow can be handled in a variety of manners. In some instances, no carry flags are used but the carry flag can be calculated by checking the result of the operation. For example, if the result of adding two numbers is smaller than either of the inputs, then a carry must have occurred. However, checking in this manner takes additional clock cycles. When a carry or overflow is detected, an exception or interrupt can be called to invoke instructions to handle the overflow. In many instances, processors use additional registers or memory to maintain carry flags and overflow flags. Processors typically have status or flag registers used to hold information such as carry, sign, overflow, and zero state information. The registers can be implemented as separate memory blocks. On programmable chips, the registers can be implemented as logic cells or as RAM blocks and are typically provided on a per-processor basis. In one example, a carry flag register and a overflow flag register are provided for each arithmetic logic unit.

Holding state information such as carry or overflow state information in memory or logic cells increases the complexity of processor datapaths. Having state information in memory or logic cells can require the use of additional multiplexers that can decrease processor efficiency. Furthermore, storing processor state in logic cells or separate memory discourages the use of multithreaded processors, as a single flag register per arithmetic logic unit is no longer sufficient. Each thread may be performing different arithmetic operations and consequently each thread would require its own flag registers. Multiplexing a number of the flag registers together is inefficient.

Consequently, the techniques of the present invention contemplate providing state information such as carry and overflow information within each processor register. Each register can include not only information indicating the number held in the register, but bits may be reserved to hold carry and overflow information. For example, registers no longer merely indicate whether a held value is −7 or +6, but instead now indicate whether a carry flag or and overflow flag should be associated with the held value. The flag information can then be fed back into a datapath as needed in an efficient manner. In one example, carry and overflow information is included in a subset of the available registers.

Figure 1:
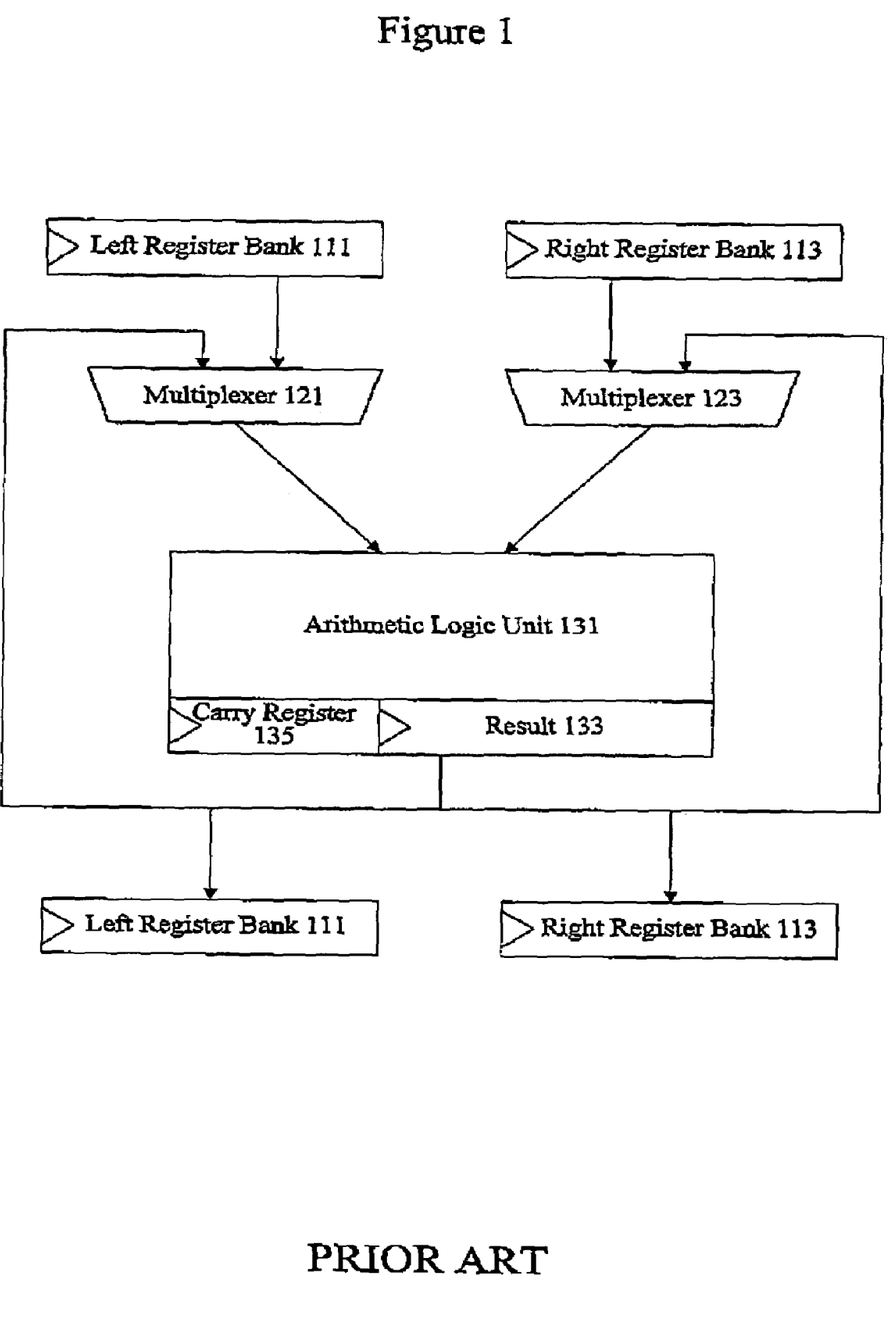
FIG. 1 is a diagrammatic representation showing a typical processor pipeline.

FIG. 1 is a diagrammatic representation showing a typical processor pipeline. The processor pipeline includes a left register bank 111 and a right register bank 113. In one example, left register bank 111 and the right register bank 113 each include the same full array of 16-bit registers. In a typical processor pipeline, the value of 16-bit register 1 would be read from left register bank 111 and the value of 16-bit register 2 would be read from right register bank 113 and provided to multiplexers 121 and 123 respectively. In this example, multiplexers 121 and 123 use the values from the left and right register banks 111 and 113 to provide the values to 16-bit arithmetic logic unit 131. The instruction is executed to determine the 16-bit result 133. If the result of the operation can not be fully expressed in 16-bits, a carry flag may be placed into a carry flag register 135. The result 133 can be written to left and right register banks 111 and 113. A processor pipeline can include a component such as an arithmetic logic unit as well as other shifting components, logic operation units, and mathematical operation units.

The result 133 can also be provided back to multiplexers 121 and 123. The carry flag also has to be manipulated back into the datapath. Additional multiplexers are typically provided to feed the carry flag information. Control circuitry for manipulating the carry flag back into the datapath can be extremely complex. If a subsequent instruction needs the results of a previous instruction, the result 133 can be passed back immediately for use in the subsequent operation. For example, if the first instruction is add 40000 to 40000, the result generates a carry flag for 16-bit arithmetic logic units. The result of the add is available through multiplexer 121 or multiplexer 123 while the result in the carry register is also made available. Control circuitry can be used to determine whether the multiplexer takes the result of a previous instruction or a value from a register bank.

In typical implementations, multiplexers in a processor pipeline allow a processor to maintain carry and overflow flags as well as the most recent results and provide the result to an arithmetic logic unit input. However, multiplexers are typically rather slow and resource intensive, and the multiplexers used in the processor pipeline typically limit the clock rate of the resulting processor. Furthermore, if a processor is multithreaded, a number of carry and overflow registers have to be made available. For example, if a processor supports 32 threads, 32 carry registers may have to be made available along with the control circuitry and multiplexers to feed the right flags back into the datapath. Consequently, the techniques of the present invention contemplate removing carry flag registers from the processor pipeline while allowing more efficient instruction processing.

Figure 2:
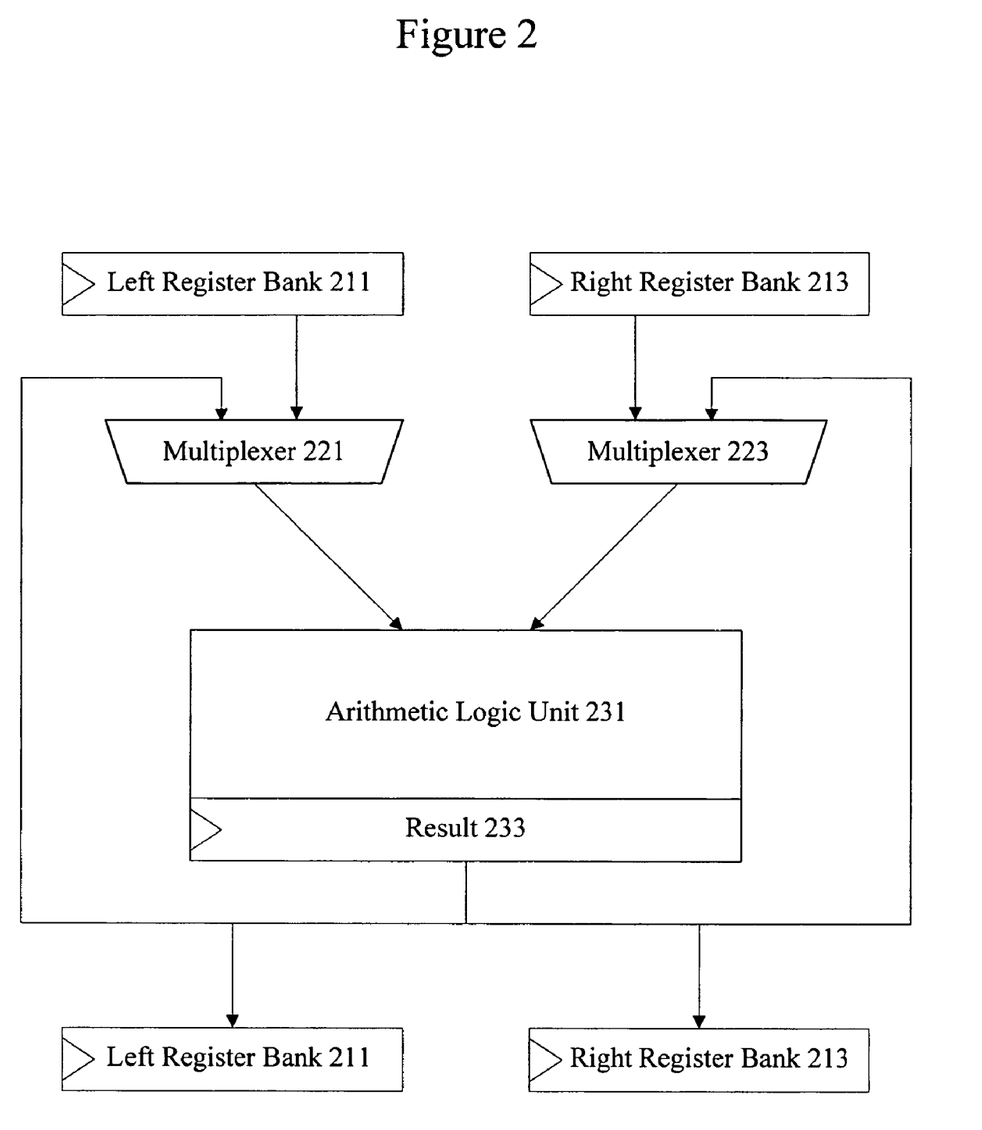
FIG. 2 is a diagrammatic representation showing a modified processor pipeline.

FIG. 2 is a diagrammatic representation showing a processor pipeline that does not use separate carry or overflow registers. According to various embodiments, left register bank 211 and right register bank 213 are configured as 17-bit registers for processing data in a 16-bit datapath. The 17-bit registers can provide data values to 16-bit arithmetic logic unit 231 through multiplexers 221 and 223. Computed result 233 is configured as a 17-bit memory. The carry flag can be treated as the 17-th bit of the operation result and all 17 bits can be stored in the 17-bit result register 233. Only 16 bits of the input registers 211 and 213 are typically used, but an instruction can access the 17th bit of the register to perform some special operation, such as mov r1 r2.carry. The 17-bit result can be fed back through multiplexers 221 and 223 or written to register banks 211 and 213.

No added carry or overflow registers are needed. According to various embodiments, the registers are implemented as 18-bit memory portions where 16-bit can be configured for holding data bits representing numbers such as −7 or 114 and a 2-bit portion can be arranged as flag bits. Any flag bits can be fed back into the arithmetic logic unit without causing extra delay. In one embodiment, the flag bits are fed into the arithmetic logic unit below the least significant bit of the arithmetic logic unit. A designer can configure when a carry bit is fed back into the arithmetic logic unit.

In one example, the arithmetic logic unit is configured to support 17-bit operations. Instead of adding 16-bit numbers represented as a[15 . . . 0] and b[15 . . . 0], the precision can be extended by 1-bit towards the least significant end. Add can be performed as (a[10 . . . 0] & '1')+(b[15 . . . 0] & Carry). If the carry flag is set, it will ripple through into the add. If it is not set, the least significant bit will not propagate further. Implementing a 17-bit adder causes negligible increase in delay, particular on a programmable chip. However, adding multiplexers, registers, and control circuitry to handle carry registers and overflow registers can add substantial delay.

Although a carry flag associated with an arithmetic logic unit in a processor core has been described, it should be noted that the techniques of the present invention can be implemented on other types of processors with different flags and states. For example, many DSP cores have both sticky and non-sticky overflow flags. Non-sticky overflow flags are set if an operation overflows and cleared if subsequent operations do not overflow. Sticky overflow flags are set and maintained if the operation overflows even if subsequent operations do not overflow. A non-sticky overflow flag can be determined in the same manner a carry flag is determined above. A sticky overflow flag is an OR of the previous overflow and the current overflow. Because the overflow flag of a register is naturally accessed when the register is read, an OR gate connected to the overflow bit of the register and the current operation can calculate the sticky overflow. The sticky overflow flag can be written back to a register essentially without added overhead. According to various embodiments, this mechanism allows the implementation of sticky overflow flags on a per register basis with essentially no additional hardware.

Figure 3:
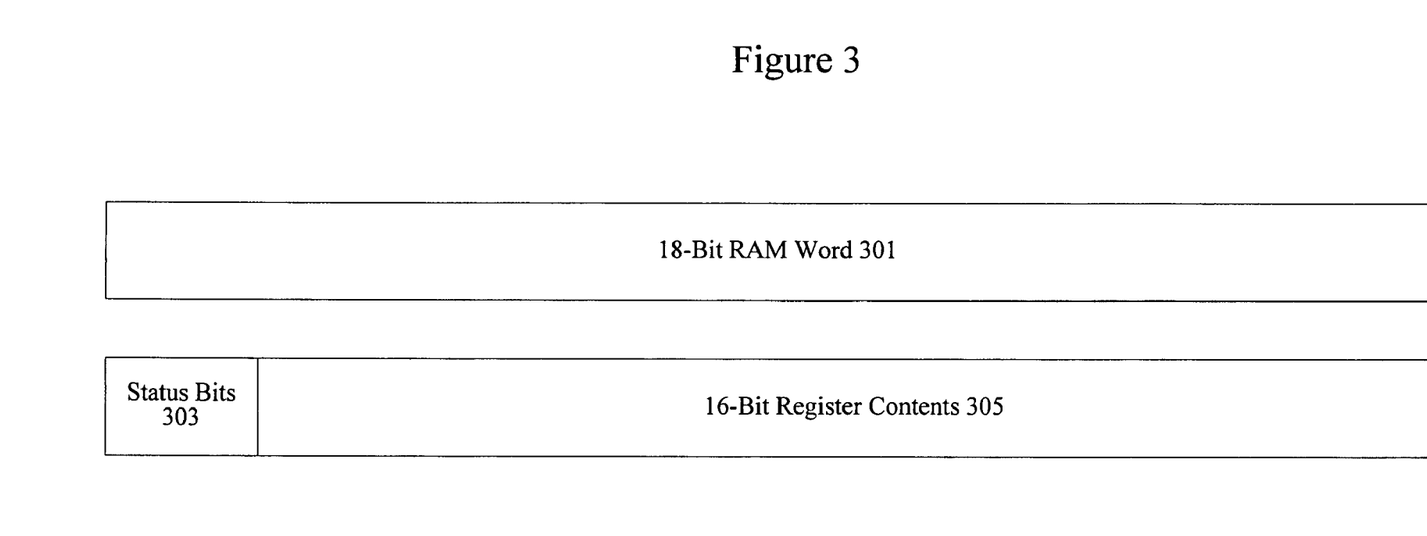
FIG. 3 is a diagrammatic representation showing one memory format.

FIG. 3 is a diagrammatic representation showing a register implemented in memory of a programmable chip. According to various embodiments, a 16-bit register is configured in memory as an 18-bit RAM word 301. By having a 16-bit register configured as an 18-bit RAM word 301, extra bits are provided for maintaining state information, such as carry or overflow information. Any information maintained after a computation provides a result that can not be fully expressed in an available result memory is referred to herein as state information. In one example, an add of a 16-bit number to another 16-bit number yields a 17-bit result that can not be expressed in a 16-bit result register. Consequently, a state flag or state bit is provided to hold state information.

The 18-bit RAM word has status bits 303 available for holding state information such as carry or overflow flags associated with 16-bit result register 305. In one embodiment, two flags are available when storing a 16-bit register in an 18-bit RAM word. However, storing flags in this manner does not permit byte enables to allow byte writes to the register, since in some examples bytes are actually 9-bits wide for 18-bit RAM words.

Figure 4:
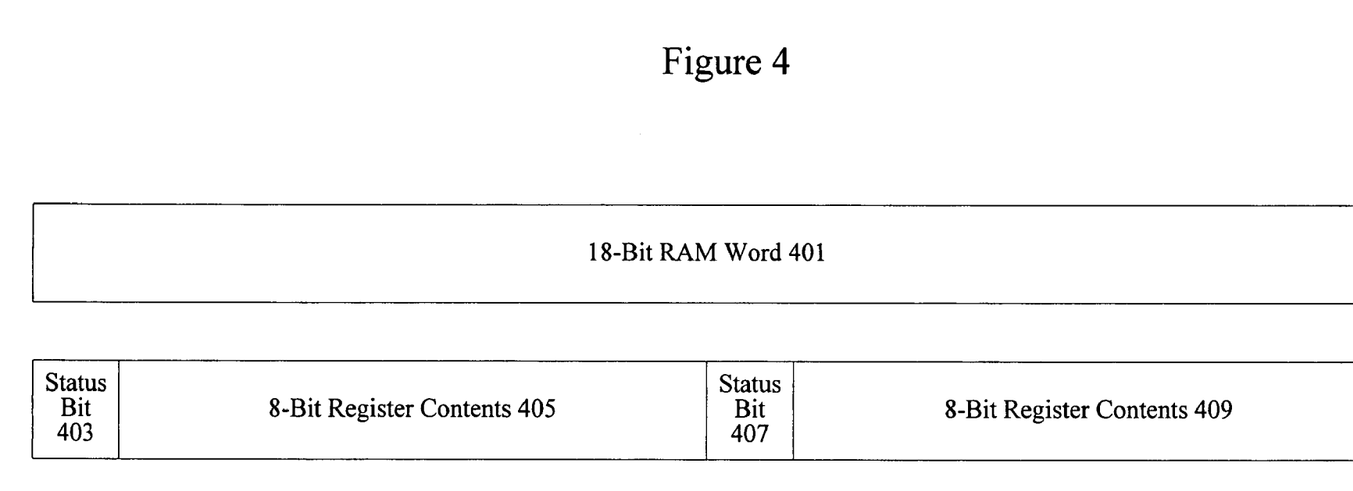
FIG. 4 is a diagrammatic representation showing another memory format.

FIG. 4 is a diagrammatic representation showing another register implementation on a programmable chip. According to various embodiments, a 16-bit register is configured in memory as an 18-bit RAM word 401. By having a 16-bit register configured as an 18-bit RAM word 301, extra bits are provided for maintaining state information, such as carry or overflow information. The 18-bit RAM word has status bits 403 and 407 available for holding state information such as carry or overflow flags associated with 16-bit result register held at 405 and 409. In one embodiment, two flags are available when storing a 16-bit register in an 18-bit RAM word. By storing the flags as the bit 9 of every 9-bit byte, a 9-bit byte can be written with no added hardware overhead.

The techniques of the present invention can be applied to a variety of different processors. However, the techniques of the present invention are particularly applicable to multithreaded processors and particularly fine grained multithreaded processors. According to various embodiments, each thread requires its own state information. When a processor is single threaded, the state information can be held in a register associated with an arithmetic logic unit. However, when a processor is multithreaded, state information is typically held in thread specific registers. In one example, state registers are provided for each thread.

In many conventional systems, threads are used in order to allow a processor to make it appear that multiple programs are running at the same time. A small piece of one program is run for a set period of time, a small piece of another program is run for set a period of time, and a small piece of another program is run for a set period of time. In one example, threads in different programs are run for hundreds of clock cycles each. A processor may switch from running one thread to another thread in the middle of a series of calculations where carry and overflow flag information needs to be maintained. Consequently, the techniques of the present invention providing state information within registers themselves is particularly beneficial when used in the context of multithreaded processors or fine-grained multithreaded processors, as will be explained further below.

According to various embodiments of the present invention, fine-grain multithreading is used. Any mechanism for performing context switching for a multithreaded processor after a small number of clock cycles is referred to herein as fine-grain multithreading. In one example, each thread at a particular stage in the processor pipeline is run for a single clock cycle before switching to a next thread. For example, the arithmetic logic unit would execute an instruction for a first thread during a first clock cycle and execute an instruction for a second thread during a second clock cycle.

The techniques and mechanisms of the present invention recognize that if each stage in the processor pipeline could run a different thread during each clock cycle using different banks of registers, processor efficiency could be increased. For example, while a first thread is waiting for the results computed during a previous instruction, different threads could be run using an arithmetic logic unit. By the time the arithmetic logic unit runs the first thread again, the results computed during the previous instruction will have been written to register memory and available for reading. Consequently, despite the overhead typically associated with frequent context switching, efficiency in a processor pipeline can be increased.

To implement a fine-grain multithreaded processor, several additional mechanisms are used. According to various embodiments, each thread is provided with its own set of registers. For example, if a single threaded processor were to include 64 registers, a processor supporting 4 threads could include 4×64 registers, or 256 registers. A processor supporting 16 hardware threads could take 16×64 or 1028 registers, a relatively large number of registers. In many examples, each stage in a processor pipeline also needs to include a context register to keep track of the thread currently running. Program counters are also used so that each thread knows the current position in a particular program. Using these additional resources may make multithreaded processors seem rather memory intensive.

Consequently the techniques of the present invention are particularly beneficial in the context of programmable chips. For example, memory on programmable chips is relatively cheap (i.e. small area and fast), whereas programmable logic is relatively expensive (i.e. big area and slow). On an application-specific integrated circuit (ASIC), the opposite is true as logic is cheap and memory is expensive. Consequently, providing an architecture with fine-grain multithreading is particularly useful for programmable devices. Fine-grain multithreaded processors are also particularly useful in applications that can more naturally be coded as multithreaded applications, such as network server applications handling a large number of connections.

Figure 5:
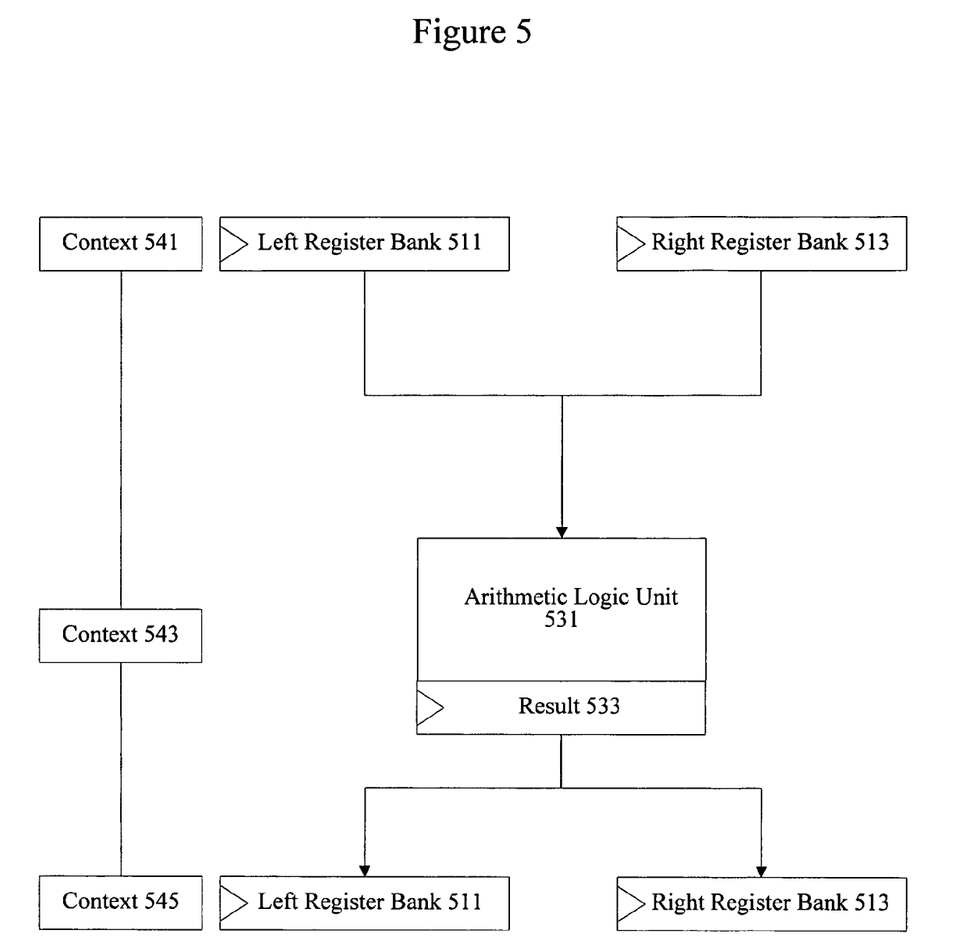
FIG. 5 is a diagrammatic representation showing context circuitry that can be used with a processor pipeline.

FIG. 5 is a diagrammatic representation showing context registers that can often be used to keep track of threads running at particular pipeline stages. According to various embodiments, a processor pipeline includes left register bank 511 and right register bank 513 providing data to arithmetic logic unit 531. The computed result 533 is then provided to left register bank 511 and right register bank 513. In many examples, each stage of the processor pipeline is associated with a context register 541, 543, or 545. According to various embodiments, each context register has a set number of bits necessary keep track of the given number of threads the processor is configured to support.

For example, a 2-bit context register is sufficient to keep track of threads running on a processor supporting 4 threads. An 3-bit context register is sufficient for tracking up to 8 threads. A 4-bit context register is sufficient for tracking up to 16 threads. Each context register is pipelined to follow the datapath. The initial context register can be generated by a simple counter. Alternatively, instead of using single context registers at each stage, a queue of contexts can be used. Different threads can be queued for running at each particular pipeline stage. By using a queue of contexts, more sophisticated thread queuing techniques can be used.

For example, if an arithmetic logic unit has a request to perform a 40-bit add for a first thread, five or more cycles would have to pass before the first thread could again be run. Consequently, additional threads could be queued to prevent the first thread from stalling. In one example with a processor supporting four threads, the next instruction from the next thread is executed on every clock cycle. Threads can be executed according to some priority mechanism, e.g. round-robin, or by using a more intelligent thread queuing mechanism. For any given thread, the time between the first instruction and a second instruction is typically greater than four clock cycles, as the other threads are also given processor time. Consequently, stalls resulting from writing to register memory and reading from register memory (i.e. Read After Write or RAW stalls) can be alleviated.

According to various embodiments, the fine-grained multithreaded processor architecture makes it appear that 4 threads are running on the processor simultaneously. Context switching is no longer reliant on interrupts or any large number of clock cycles. Instead, context switching is made extremely frequent but efficient. By using fine-grained multithreading, forwarding multiplexers are removed from the processor pipeline, simple compilers and assemblers can be used, and processor stalling can be substantially reduced.

Figure 6:
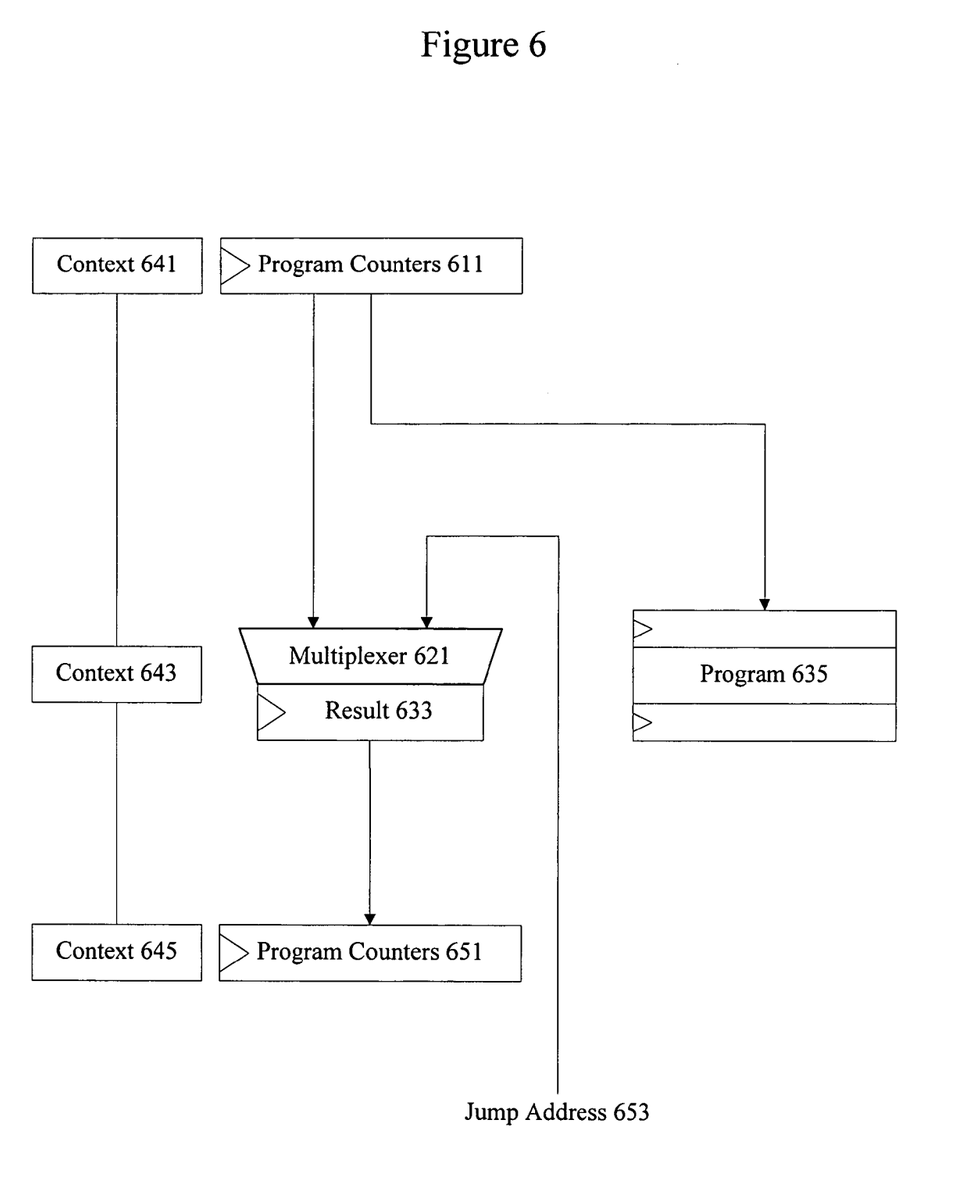
FIG. 6 is a diagrammatic representation showing program counters.

FIG. 6 shows additional mechanisms that can be used for implementing a fine-grained multithreaded processor. According to various embodiments, each thread has its own program counter. The context registers 641, 643, and 645 are used to read and write the program counter associated with the selected thread. According to various embodiments, the program counter tracks run position of the program. The program counter memory 611 provides the program counter value to multiplexers 621 and program 635. The program 635 is used where different threads are running different programs. However, if different threads are running the same program, program 635 does not need to be used. Program counter value 611 is incremented before being provided to multiplexers 621. Control logic is used to determine whether a jump address 653 should be used or whether the incremented program counter value should be used.

The result 633 can then be written to program counter memory 651. It should be noted that program counter logic is pipelined, like much of the other processor logic noted above. Each stage associated with each context register 641, 643, and 645 may be processing information for different threads during the same clock cycle.

Figure 7:
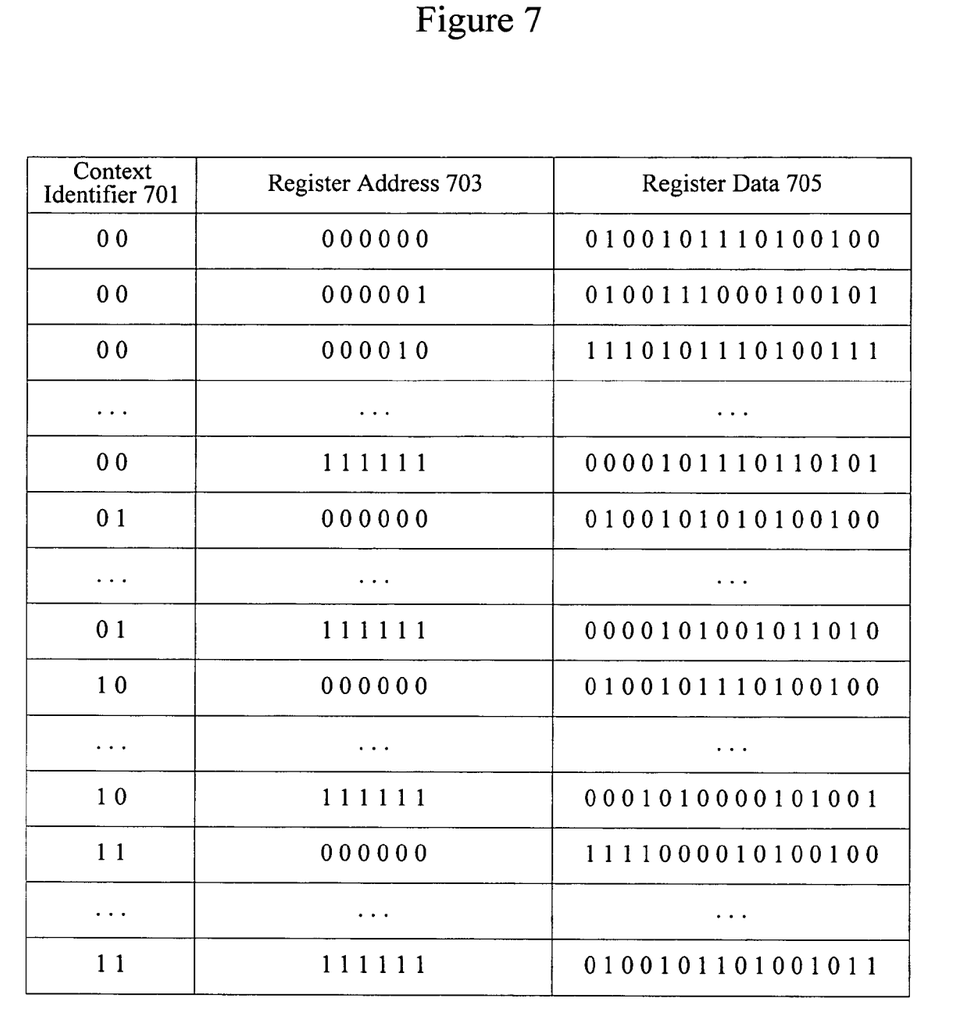
FIG. 7 is diagrammatic representation showing memory addresses.

According to various embodiments, using multiple threads is possible due to context tracking mechanisms provided in the fine-grained multithreaded processor. Although there are a variety of mechanisms for tracking context information, one particularly convenient mechanism is shown in FIG. 7. In this example, a 2-bit context register can be used to track up to 4 different threads running on the multithreaded processor. The 2-bit context register corresponds to a context identifier 701. A register address portion 703 has 6 bits available to identify up to 64 registers per context identifier. Each context identifier register address pair can have register data 705. For example, context identifier 0 0 associated with a first thread can be used to locate up to 64 registers ranging from 0 0 0 0 0 0 to 1 1 1 1 1 1. Similarly, context identifier 0 1 associated with a second thread can be used to locate up to 64 registers ranging from 0 0 0 0 0 0 to 1 1 1 1 1 1. The most significant bits of a memory address can be used to identify the associated thread and the subsequent bits can be used to identify particular registers.

Figure 8:
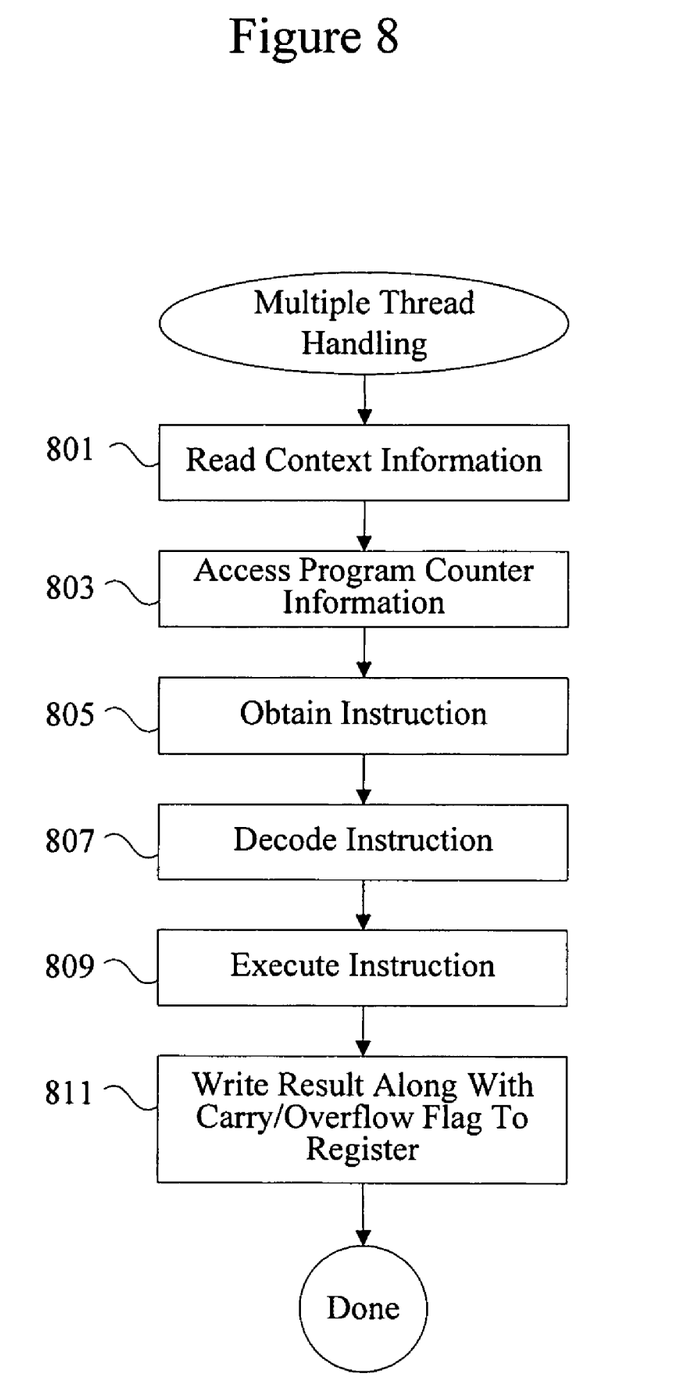
FIG. 8 is a flow process diagram showing a technique for handling state information.

FIG. 8 is a flow process diagram showing a technique for maintaining state information. FIG. 8 is described with reference to a particular thread being processed. At 801, the processor stage is configured to read context information to identify a thread. At 803, program counter information for that particular thread is accessed, typically at the next pipeline stage. At 805, an instruction is obtained by accessing the program counter information as well as context information for the particular thread. At 807, the instruction associated with the thread is decoded. At 809, the instruction is executed typically at the arithmetic logic unit stage of a processor. At 811, the result along with any carry or overflow flag is written to a register bank. Because the carry or overflow flag is included as part of a register, no added cycles are needed to process the flag. Because of the use of pipelining, a processor does not stall when waiting for the result written to the register bank to become available. Instead, the processor typically can be running instructions associated with other threads.

Although the techniques and mechanisms of the present invention can be implemented on a variety of electronic devices, the techniques and mechanisms are particularly applicable to processors implemented on programmable chips. A fine-grained multithreaded processor typically requires less logic and is easier to design than a processor using forwarding multiplexers and can be implemented using a variety of register widths for holding data and associated state information.

Figure 9:
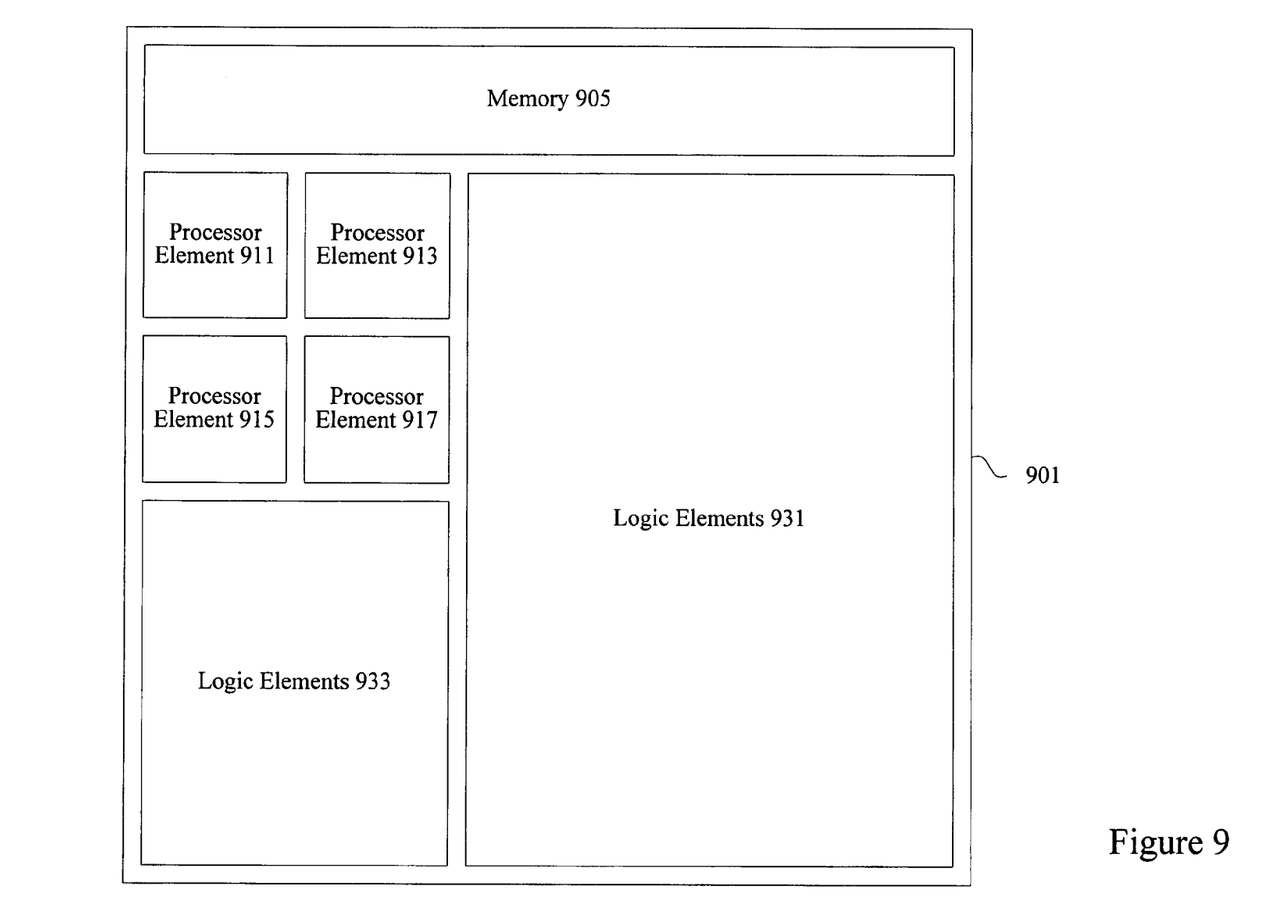
FIG. 9 is diagrammatic representation a programmable chip that can be implemented using the techniques and mechanisms of the present invention.

FIG. 9 is a diagrammatic representation of a programmable chip that can be implemented as a fine-grained multithreaded processor with state information included in registers. In one example, the heterogeneous programmable chip includes memory 905, logic elements 931 and 933, and processor elements 911, 913, 915, and 917. It should be noted that various components such as processor elements 911, 913, 915, and 917 are optional. The programmable chip does not need these elements incorporated and may have one or more processor cores. Alternatively, a variety of different components can be assembled to form a processor core. Instead of providing a generic processor core on a programmable chip, different components can be provided to allow customization of a fine-grained multithreaded processor core.

Logic elements 931 typically can be implemented using components such as antifuses, static RAM, and EPROMS. Any mechanism in a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

According to various embodiments, each processor element includes multiplier blocks and adder/output blocks. The multiplier block includes input registers, a multiplier, and a pipeline register for pipelining multiply-accumulate and multiply-add/subtract functions.

Figure 10:
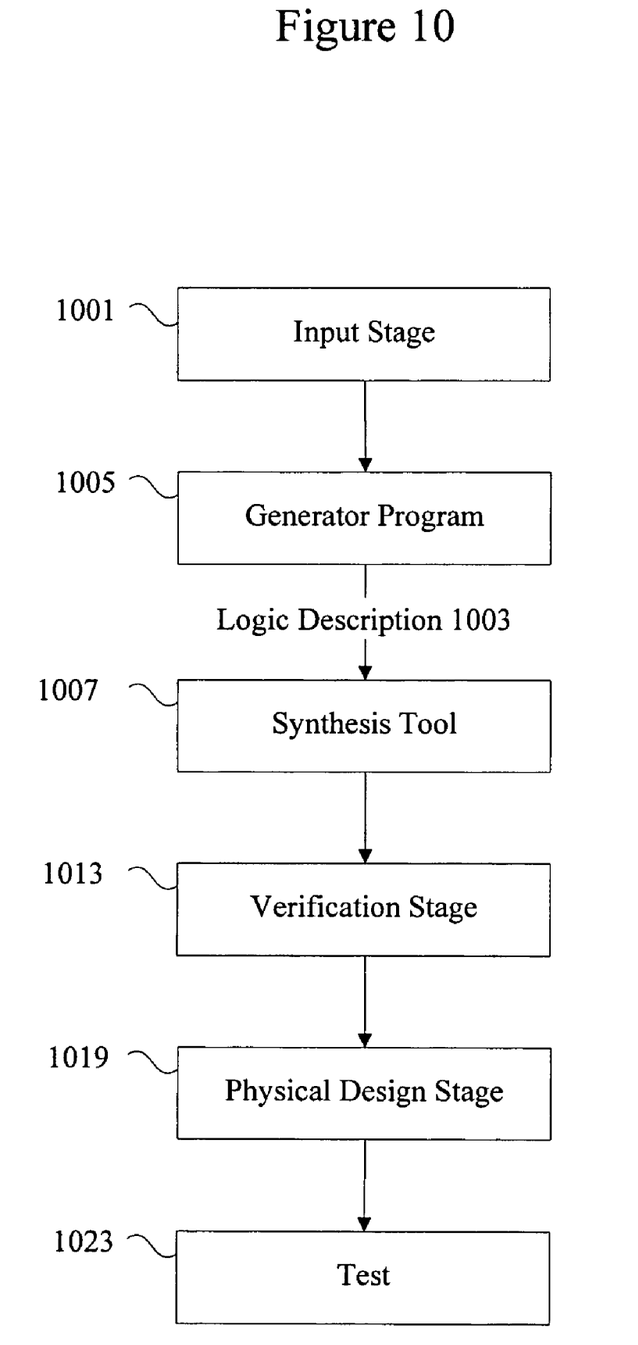
FIG. 10 is a diagrammatic representation showing a technique for implementing the programmable chip.

FIG. 10 is a diagrammatic representation showing implementation of an electronic device having a fine-grained multithreaded processor core. An input stage 1001 receives selection information typically from a user for logic such as a processor core as well as other components to be implemented on an electronic device. A generator program 1005 creates a logic description and provides the logic description along with other customized logic to any of a variety of synthesis tools, place and route programs, and logic configuration tools to allow a logic description to be implemented on an electronic device.

In one example, an input stage 1001 often allows selection and parameterization of components to be used on an electronic device. In some examples, components provided to an input stage include intellectual property functions, megafunctions, and intellectual property cores. The input stage 1001 may be a graphical user interface using wizards for allowing efficient or convenient entry of information. The input stage may also be a text interface or a program reading a data file such as a spreadsheet, database table, or schematic to acquire selection information. The input stage 1001 produces an output containing information about the various modules selected.

In typical implementations, the generator program 1005 can identify the selections and generate a logic description with information for implementing the various modules. The generator program 1005 can be a Perl script creating HDL files such as Verilog, Abel, VHDL, and AHDL files from the module information entered by a user. According to various embodiments, the generator program 1005 also provides information to a synthesis tool 1007 to allow HDL files to be automatically synthesized. In some examples, a logic description is provided directly by a designer. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 1009.

As will be appreciated by one of skill in the art, the input stage 1001, generator program 1005, and synthesis tool 1007 can be separate programs. The interface between the separate programs can be a database file, a log, or simply messages transmitted between the programs. For example, instead of writing a file to storage, the input stage 1001 can send messages directly to the generator program 1005 to allow the generator program to create a logic description. Similarly, the generator program can provide information directly to the synthesis tool instead of writing HDL files. Similarly, input stage 1001, generator program 1005, and synthesis tool 1007 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 1007.

A synthesis tool 1007 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 1013 typically follows the synthesis stage 1007. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 1013, the synthesized netlist file can be provided to physical design tools 1019 including place and route and configuration tools. A place and route tool typically locates logic cells on specific logic elements of a target hardware device and connects wires between the inputs and outputs of the various logic elements in accordance with logic required to implement an electronic design. The device can also be physically tested at 1023.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 1001, the generator program 1005, the synthesis tool 1007, the verification tools 1013, and physical design tools 1019 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 11:
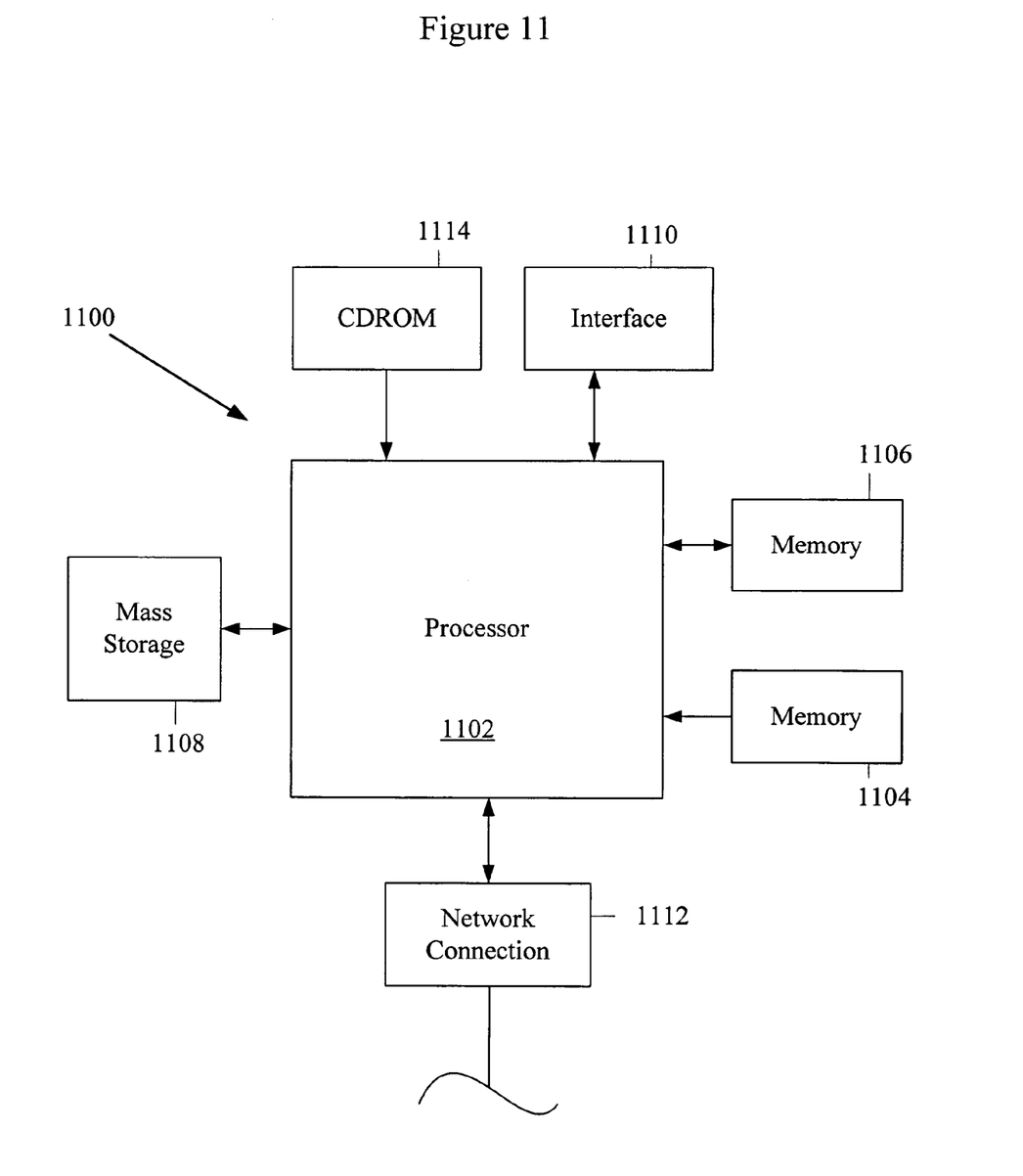
FIG. 11 is a diagrammatic representation of a computer system that can be used to implement the techniques of the present invention.

FIG. 11 illustrates a typical computer system that can be used to implement a programmable chip having a multi-threaded processor core. The computer system 1100 includes any number of processors 1102 (also referred to as central processing units, or CPUs) that are coupled to devices including memory 1106 (typically a random access memory, or "RAM"), memory 1104 (typically a read only memory, or "ROM"). The processors 1102 can be configured to generate a test sequences for any designated processor. As is well known in the art, memory 1104 acts to transfer data and instructions uni-directionally to the CPU and memory 1106 is used typically to transfer data and instructions in a bi-directional manner.

Both of these memory devices may include any suitable type of the computer-readable media described above. A mass storage device 1108 is also coupled bi-directionally to CPU 1102 and provides additional data storage capacity and may include any of the computer-readable media described above. The mass storage device 1108 may be used to store programs, data and the like and is typically a secondary storage medium such as a hard disk that is slower than memory. The mass storage device 1108 can be used to hold a library or database of prepackaged logic or intellectual property functions, as well as information on generating particular configurations. It will be appreciated that the information retained within the mass storage device 1108, may, in appropriate cases, be incorporated in standard fashion as part of memory 1106 as virtual memory. A specific mass storage device such as a CD-ROM 1114 may also pass data uni-directionally to the CPU.

CPU 1102 is also coupled to an interface 1110 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1102 optionally may be coupled to a computer or telecommunications network using a network connection as shown generally at 1112. With such a network connection, it is contemplated that the CPU might receive information from the network, or might output information to the network in the course of performing the above-described method steps. It should be noted that the system 1100 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 1108 or 1114 and executed on CPU 1108 in conjunction with primary memory 1106.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of different file formats, languages, and communication protocols and should not be restricted to the ones mentioned above. Therefore, the scope of the invention should be determined with reference to the appended claims.

What is claimed is:

1. A processor, comprising;
   a plurality of registers, wherein each of the plurality of registers is a processor register and comprises data bits for holding data and one or more flag and status bits for holding carry flag information;
   an arithmetic logic unit operable to perform arithmetic and bit shifting operations, the arithmetic logic unit coupled to the plurality of registers, wherein the arithmetic logic unit is operable to read data and carry flag information from one of the plurality of registers and write data and carry flag information to one of the plurality of registers.

2. The processor of claim 1, wherein the one or more flag and status bits hold overflow flag information.

3. The processor of claim 2, wherein the one or more flag bits hold sticky overflow flag information.

4. The processor of claim 1, wherein the processor is a multithreaded processor.

5. The processor of claim 1, wherein providing flag and status information in each of the plurality of registers allows the processor to handle a plurality of threads, wherein each thread uses disparate flag and status bits.

6. The processor of claim 5, wherein the plurality of threads are each associated with a subset of the plurality of registers.

7. The processor of claim 6, further comprising context circuitry associated with the plurality of threads, wherein the context circuitry is operable to track which of the plurality of threads is being processed by a particular stage.

8. The processor of claim 6, wherein the arithmetic logic unit is operable to process the plurality of threads, the arithmetic logic unit configured to process a particular thread for a single clock cycle before context switching to process a next thread, wherein each of the plurality of threads are processed for the single clock cycle before context switching.

9. The processor of claim 1, wherein the processor is a processor core on a programmable chip.

10. The processor of claim 8, wherein the particular thread is processed for a single clock cycle to allow a memory access to complete before continuing processing of the particular tread.

11. The processor of claim 10, further comprising a plurality of program counters, wherein the program counters track the processing location of each thread.

12. The processor of claim 1, wherein the plurality of registers are configured as memory on a programmable chip.

13. The processor of claim 1, wherein the processor is a central processing unit or a digital signal processor.

14. The processor of claim 1, further comprising context circuitry, wherein context circuitry is a context register.

15. The processor of claim 14, wherein the processor comprises a plurality of stages, each stage having an associated context register.

16. The processor of claim 15, wherein each thread is associated with a program counter.

17. The processor of claim 16, wherein the plurality of stages comprise reading the context register, accessing the program counter, obtaining an instruction, decoding the instruction, executing the operation, and writing a result to one of the plurality of registers.

18. The processor of claim 10, further comprising a plurality of program counters associated with the plurality of threads.

19. A method for processing data, comprising;
providing data to an arithmetic logic unit associated with a processor, the data obtained from registers comprising data bits for holding data and one or more flag and status bits for holding carry flag information;
processing the data at the arithmetic logic unit operable to perform arithmetic and bit shifting operations, the arithmetic logic unit coupled to a plurality of registers including a processor register, wherein the arithmetic logic unit is operable to read data and carry flag information from one of the plurality of registers and write data and carry flag information to one of the plurality of registers.

20. The method of clam 19, wherein the one or more flag and status bits hold overflow flag information.

21. The method of claim 20, wherein the one or more flag bits hold sticky overflow flag information.

22. The method of claim 19, wherein the processor is a multithreaded processor.

23. The method of claim 19, wherein providing flag and status information in each of the plurality of registers allows the processor to handle a plurality of threads, wherein each thread uses writes disparate flag and status bits.

24. The method of claim 23, wherein the plurality of threads are each associated with a subset of the plurality of registers.

25. The method of claim 24, further comprising context circuitry associated with the plurality of threads, wherein the context circuitry is operable to track which of the plurality of threads is being processed by a particular stage.

26. The method of claim 25, wherein the arithmetic logic unit is operable to process the plurality of threads, the arithmetic logic unit configured to process a particular thread for a single clock cycle before context switching to process a next thread, wherein each of the plural of threads are processed for the single clock cycle before context switching.

27. A programmable chip comprising;
means for providing data to an arithmetic logic unit associated with a processor, the data obtained from registers comprising data bits for holding data and one or more flag and status bits for holding carry flag information;
means for processing the data at the arithmetic logic unit operable to perform arithmetic and bit shifting operations, the arithmetic logic unit coupled to a plurality of registers including a processor register, wherein the arithmetic logic unit is operable to read data and carry flag information from one of the plurality of registers and write data and carry flag information to one of the plurality of registers.

28. The programmable chip of claim 27, wherein the one or more flag and status bits hold overflow flag information.

29. The programmable chip of claim 28, wherein the one or more flag bits hold sticky overflow flag information.

30. The programmable chip of claim 27, wherein the processor is a multithreaded processor.

31. The programmable chip of claim 27, wherein providing flag and status information in each of the plurality of registers allows the processor to handle a plurality of threads, wherein each thread uses writes disparate flag and status bits.

* * * * *